United States Patent [19]

LeMonds et al.

[11] Patent Number: 5,243,758
[45] Date of Patent: Sep. 14, 1993

[54] DESIGN AND PROCESSING METHOD FOR MANUFACTURING HOLLOW AIRFOILS (THREE-PIECE CONCEPT)

[75] Inventors: Jeffrey LeMonds, Clifton Park, N.Y.; Jung-Ho Cheng, Taipei, Taiwan; Gene E. Wiggs, West Chester, Ohio; Gary T. Martini, Loveland, Ohio; Ralph E. Patsfall, Cincinnati, Ohio

[73] Assignee: General Electric Company, Schenectady, N.Y.

[21] Appl. No.: 803,852

[22] Filed: Dec. 9, 1991

[51] Int. Cl.⁵ .............................................. B23P 15/00
[52] U.S. Cl. ................................. 29/889.72; 29/889.7; 29/463
[58] Field of Search ................. 29/889.72, 889.7, 463; 228/157, 193, 234, 236, 243

[56] References Cited

U.S. PATENT DOCUMENTS

| | | | |
|---|---|---|---|
| 2,982,012 | 5/1961 | Wilkins et al. | 228/118 |
| 3,920,175 | 11/1975 | Hamilton et al. | 228/173 |
| 3,927,817 | 12/1975 | Hamilton et al. | 228/157 |
| 3,936,920 | 2/1976 | Conn, Jr. | 29/889.72 |
| 4,217,397 | 8/1980 | Hayase et al. | 228/157 |
| 4,294,419 | 10/1981 | Fouse et al. | 244/117 R |
| 4,392,602 | 7/1983 | Darby | 228/157 |
| 4,530,197 | 7/1985 | Rainville | 52/797 |
| 4,642,863 | 2/1987 | Schulz | 29/156.8 B |
| 4,882,823 | 11/1989 | Weisert et al. | 29/889.72 |
| 4,934,580 | 6/1990 | Sutton | 228/157 |
| 5,024,369 | 6/1991 | Froes et al. | 228/265 |
| 5,063,662 | 11/1991 | Porter et al. | 29/889.72 |

OTHER PUBLICATIONS

Weisert, "Hollow Titanium Turbofan Blades," Report presented at the Metallurgical Society, AIME Symposium on Superplasticity in Aerospace, Phoenix, Ariz., Jan. 25–28, 1988.

Primary Examiner—Irene Cuda
Attorney, Agent, or Firm—Patrick R. Scanlon; Paul R. Webb, II

[57] ABSTRACT

A method for making a three-piece hollow airfoil includes preforming three metal sheets into initial shapes and sealing them together to form an in-process assembly. Internal cavities are formed in the assembly prior to sealing. The assembly is subjected to high temperature and pressure to diffusion bond the sheets together at selected points. The cavities are then subjected to internal pressure at high temperature in order to inflate and superplastically deform the assembly to the desired shape. Excess material may be machined off after inflation.

22 Claims, 12 Drawing Sheets

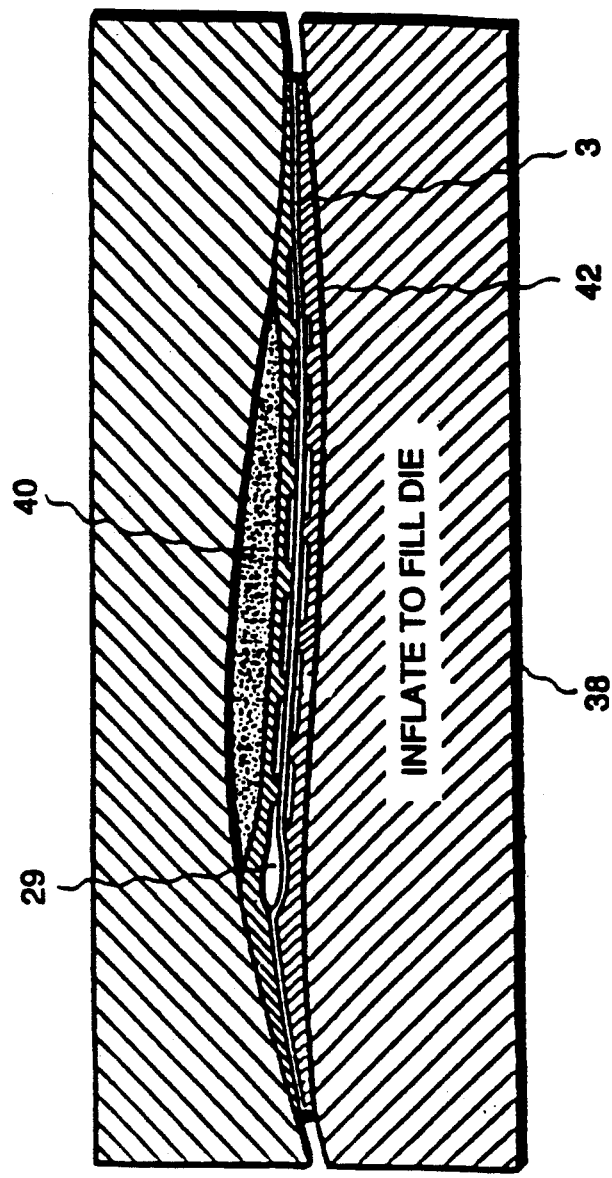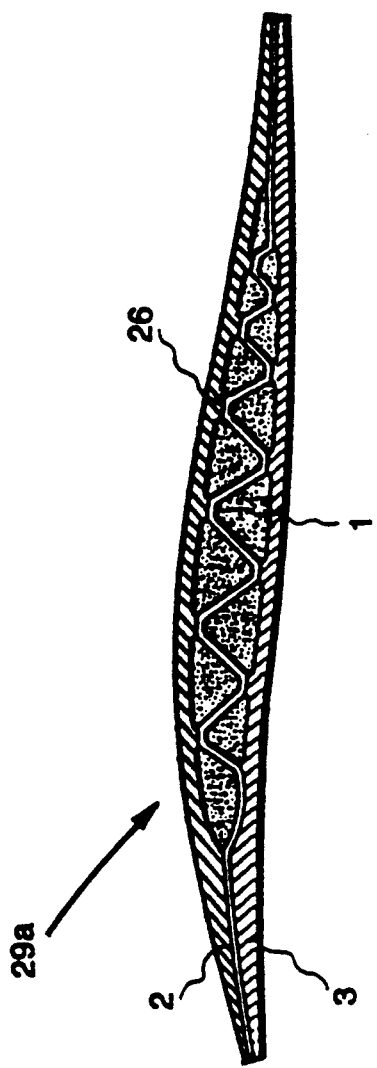
FIG. 1h
FIG. 1i

DESIGN AND PROCESSING METHOD FOR MANUFACTURING HOLLOW AIRFOILS (THREE-PIECE CONCEPT)

CROSS REFERENCES TO RELATED APPLICATIONS

This application is related to copending application entitled "Method for Manufacturing Hollow Airfoils (Four-Piece Concept)", Ser. No. 07/803,853, filed concurrently herewith and assigned to the same assignee as the present invention.

BACKGROUND OF THE INVENTION

This invention relates generally to fabricating hollow airfoils and more particularly concerns a method of producing lightweight, high-strength hollow airfoils using diffusion bonding and superplastic forming techniques. This method is particularly useful in making hollow titanium aircraft engine blades for integrally-bladed rotors.

Superplastic forming is a technique that relies on the capability of certain materials, such as titanium alloys, to develop unusually high tensile elongation with a minimal tendency towards necking when submitted to coordinated time-temperature-strain conditions within a limited range. Superplastic forming is useful in producing a wide variety of strong, lightweight articles.

Many of the same materials used in superplastic forming are also susceptible to diffusion bonding. Diffusion bonding is a process which forms a metallurgical bond between similar parts which are pressed together at elevated temperature and pressure for a specific length of time. Bonding is believed to occur by the movement of atoms across adjacent faces of the parts. Diffusion bonding provides substantial joint strength with little geometrical distortion and without significantly changing the physical or metallurgical properties of the bonded material.

It has long been desirable to fabricate various aircraft components, such as door panels and wing flaps, as hollow bodies. The benefits of such include a substantial reduction in weight which provides improved fuel efficiency and increased thrust-to-wight ratio. Despite the increasing popularity in applying diffusion bonding and superplastic forming (DB/SPF) techniques to the manufacture of aircraft components, there are many critical problems to overcome in successfully forming a hollow airfoil. Parts formed using DB/SPF techniques have very complex geometries, exhibit highly non-linear material behavior, and are subject to large irreversible strains. Thus, there exists the possibility of many deformation-induced instabilities, such as necking, grooving, buckling and shear localization, which substantially weaken the structural integrity of the part.

The stringent requirements for both the external aerodynamic shape and internal structure of hollow airfoils present another problem in the manufacture of such parts. In order to produce the desired final shape and thickness, the in-process shape (i.e., the shape and size of a part prior to superplastic deformation) must be known. The determination of the in-process shape has proven to be a difficult task.

SUMMARY OF THE INVENTION

Accordingly, it is an object of the present invention to provide a method for manufacturing hollow airfoils which avoids the problem of deformation-induced instabilities.

More specifically, it is an object of the present invention to provide a method for manufacturing hollow airfoils from three metal sheets using a combination of diffusion bonding and superplastic forming techniques.

In addition, it is an object of the present invention to provide a procedure for defining the in-process shape of of the three metal sheets prior to superplastic deformation.

These and other objects are accomplished in the present invention by first forming three metal sheets into their in-process shapes. Then, a plurality of cavities are machined into two of the sheets and stopoff is applied to each of the cavities. The three sheets are arranged with the unaltered or core sheet sandwiched between the two machined sheets so that the machined surfaces face the core sheet. The sheets are then welded together around their peripheries. One of the outer sheets is convex; the other outer sheet is concave. The assembled sheets are maintained under adequate pressure-temperature-time duration conditions so as to diffusion bond the portions of the outer sheets lacking stopoff to the core sheet. Sufficient pressure-temperature-time duration conditions are then internally applied to the cavities to cause at least one of the outer sheets to superplastically deform. After deformation, excess material is machined off.

The dimensions of the finished airfoil are dependent on the shape and size of the assembled sheets prior to superplastic forming (i.e., the in-process shape). Consequently, determining the in-process shape is essential to making an airfoil of proper dimensions. A crucial element in defining the in-process shape in the present invention is knowing the initial thickness of the convex sheet. Since the shape and thickness of an airfoil are determined by the designer as prescribed by the conditions the airfoil will operate under, the design dimensions are known to the manufacturer of an airfoil. Therefore, the method of the present invention relies on known design values in determining the initial thickness of the convex sheet. Specifically, the in-process thickness is dependent on the final thickness and is determined mathematically from a number of known variables.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

FIGS. 1a–1j illustrate the method of a preferred embodiment of the present invention.

DETAILED DESCRIPTION OF THE INVENTION

Figure 1A:
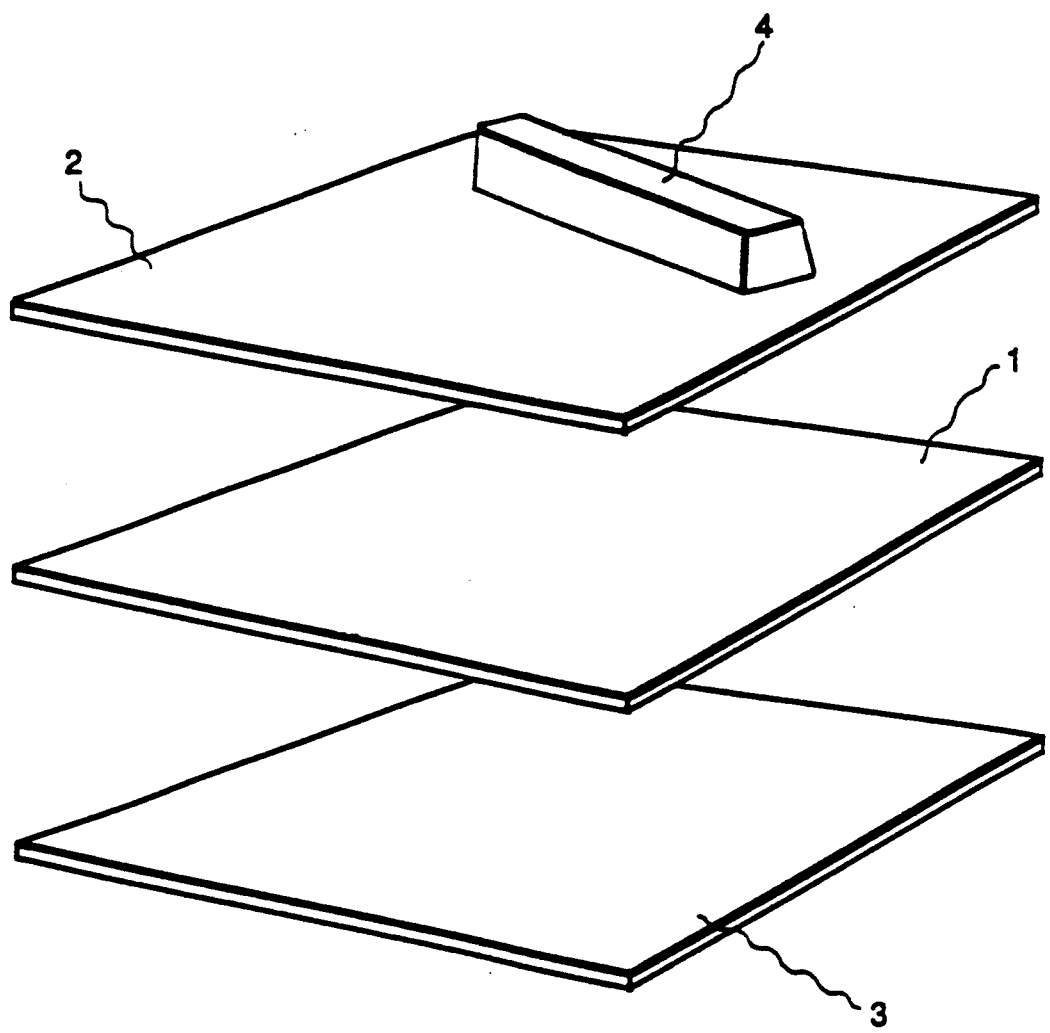

Turning first to FIG. 1a, the components used in making the hollow airfoil are shown. In accordance with the present invention, three machined sheets are provided. The sheets are preferably made of, for example, a titanium alloy comprised of about 6% aluminum, 4% vanadium and the balance titanium, hereinafter referred to as Titanium-6Aluminum-4Vanadium, but can be any material capable of superplastic forming and diffusion bonding. They comprise a core sheet 1 and two face sheets 2 and 3. The core sheet 1 is approximately 0.030 to 0.070 inches thick. The face sheets 2,3 are considerably thicker than the core sheet, being up to 0.750 inches thick. Each face sheet is provided with an oversized root 4 which provides a means for attaching the finished blade to the hub of an aircraft engine.

Figure 1B:
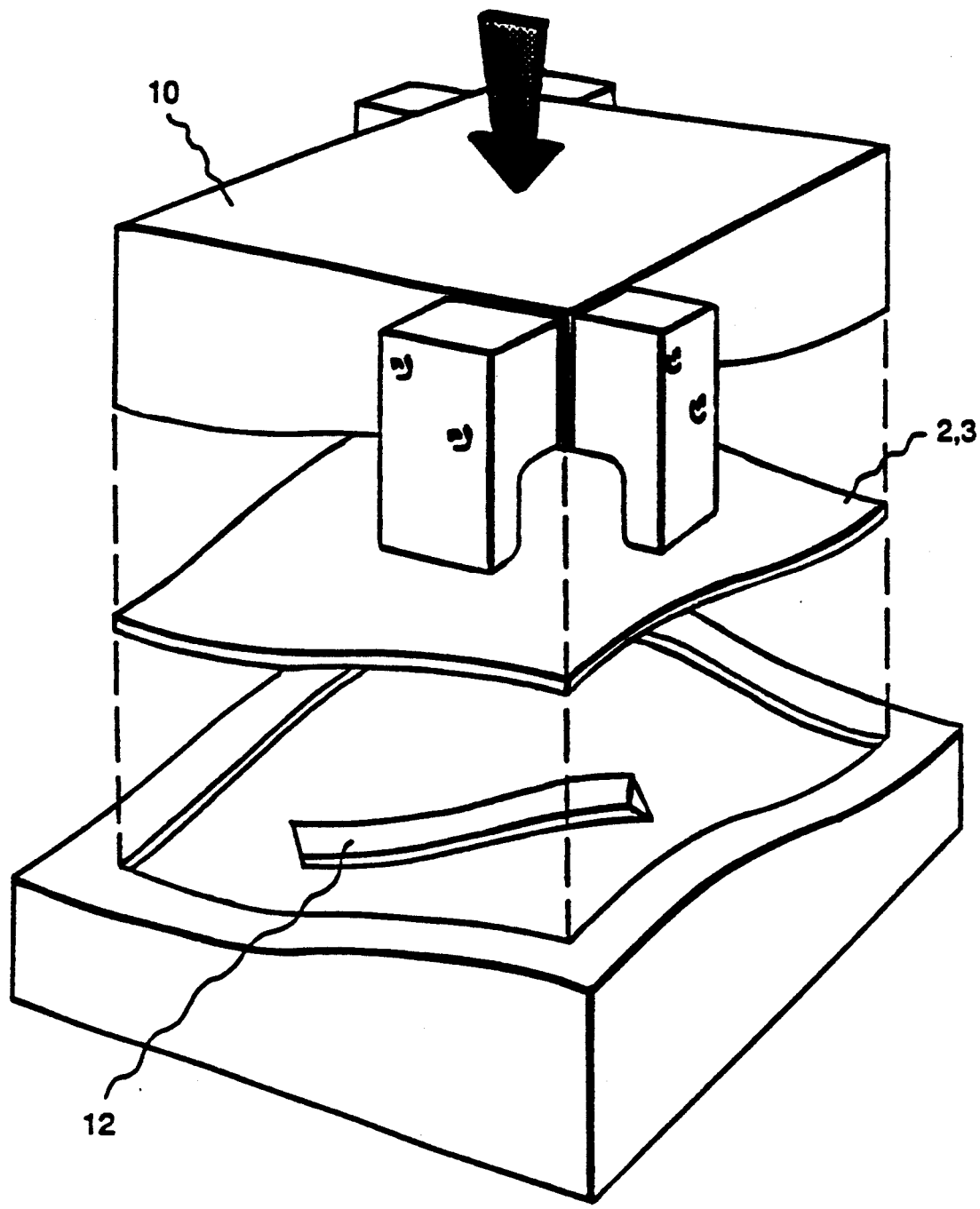
Figure 1C:
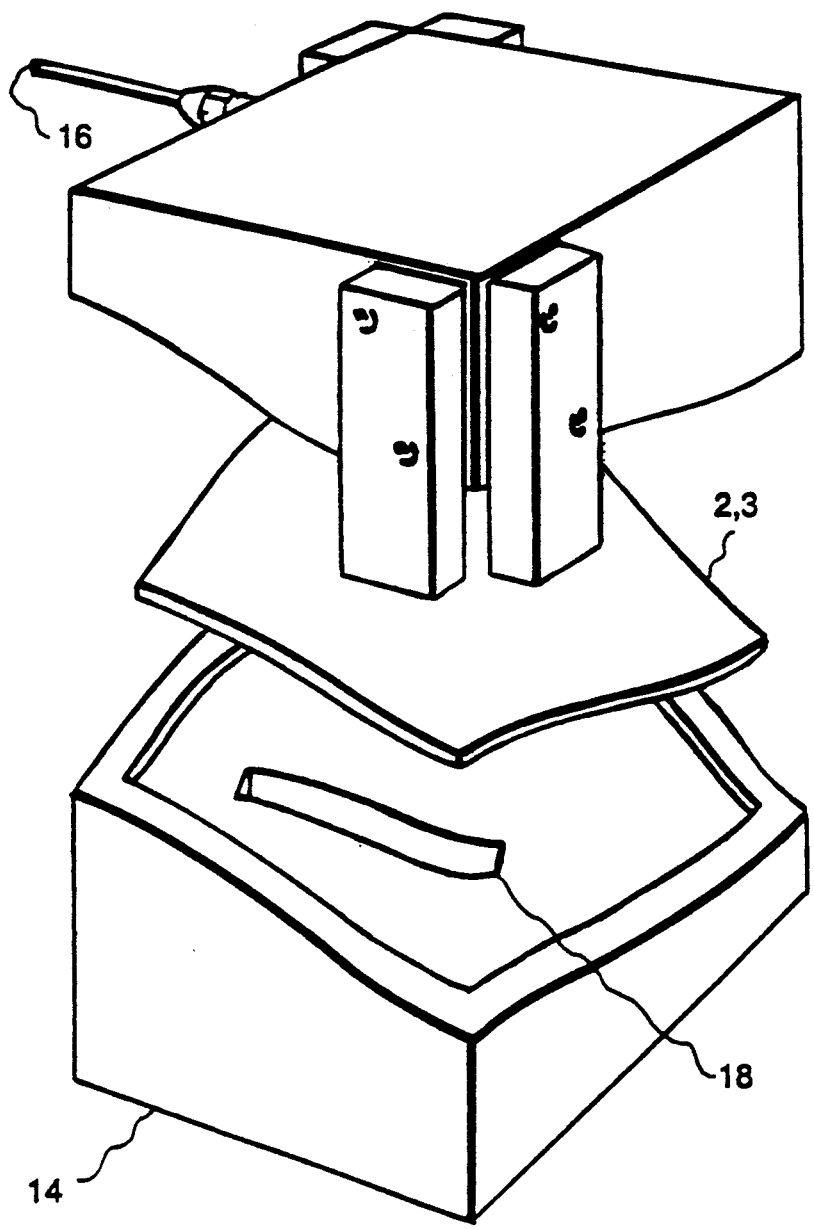

Initially, the three separate sheets must be formed into their in-process shapes before the superplastic forming steps can be carried out. The in-process shape is the shape each respective part must take prior to superplastic forming to ensure that the desired final shape and thickness will be achieved after deformation. FIG. 1b shows the first step in which forming of the face sheets 2,3 is started in a hot form press 10. A groove 12 is provided in the lower die of the hot form press 10 in order to accommodate the root 4 on each of the face sheets. Next, a superplastic forming procedure is used to finish forming the face sheets 2,3 into the in-process shape. As shown in FIG. 1c, a superplastic forming (SPF) tool 14 is used for this step. The SPF tool 14 includes a port 16. A gas, such as argon, is forced through the port 16 to provide the pressure for superplastically deforming the sheet. The SPF tool 14 also has a groove 18 for receiving the root 4 of each face sheet. An alternative method of forming the face sheets 2,3 is to near-net-shape forge them into the desired in-process shape. Near-net-shape forging is carried out in a forge press at a high temperature on the order of approximately 1700° F.

Figure 1D:
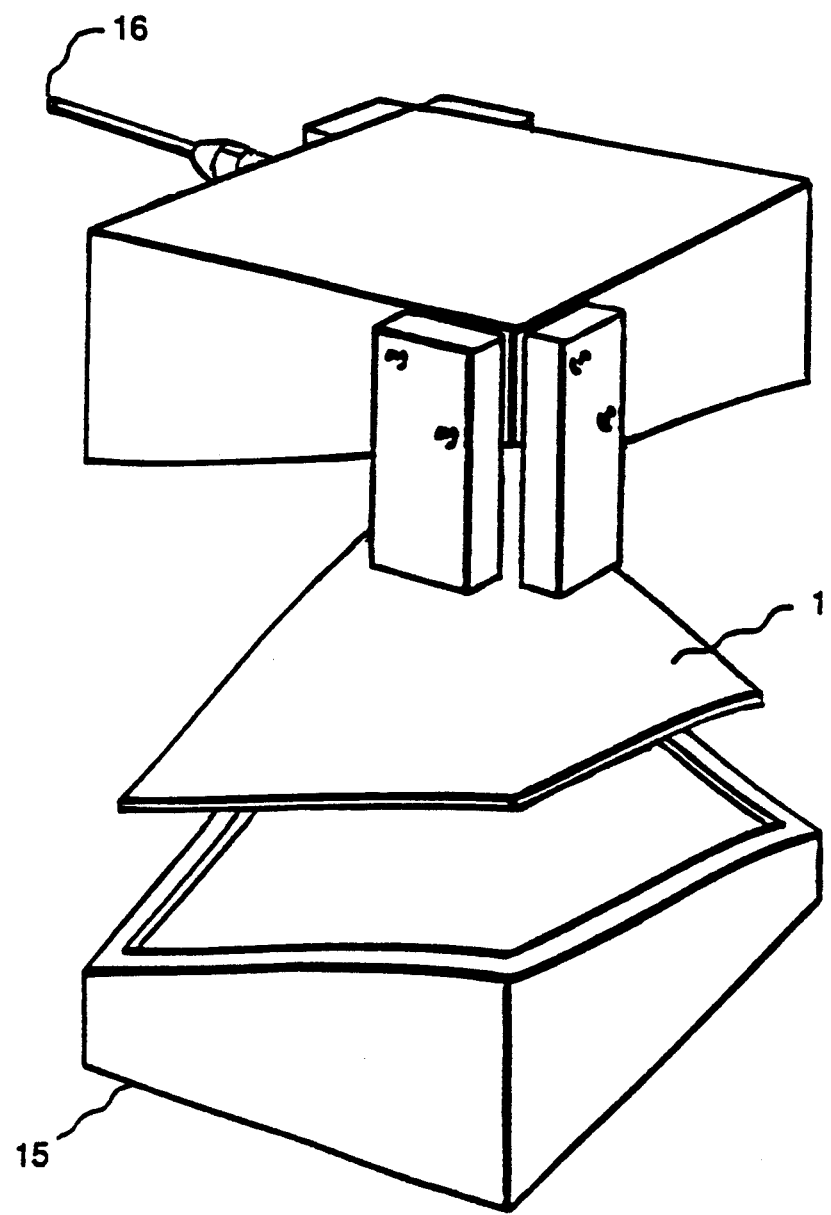

FIG. 1d shows the step of superplastically forming the core sheet 1 into its in-process shape. Deformation of the core sheet is also carried out in an SPF tool 15. A preliminary hot forming step can be used but is not required because the core sheet, being much thinner than the face sheets, is easier to deform.

Figure 1E:
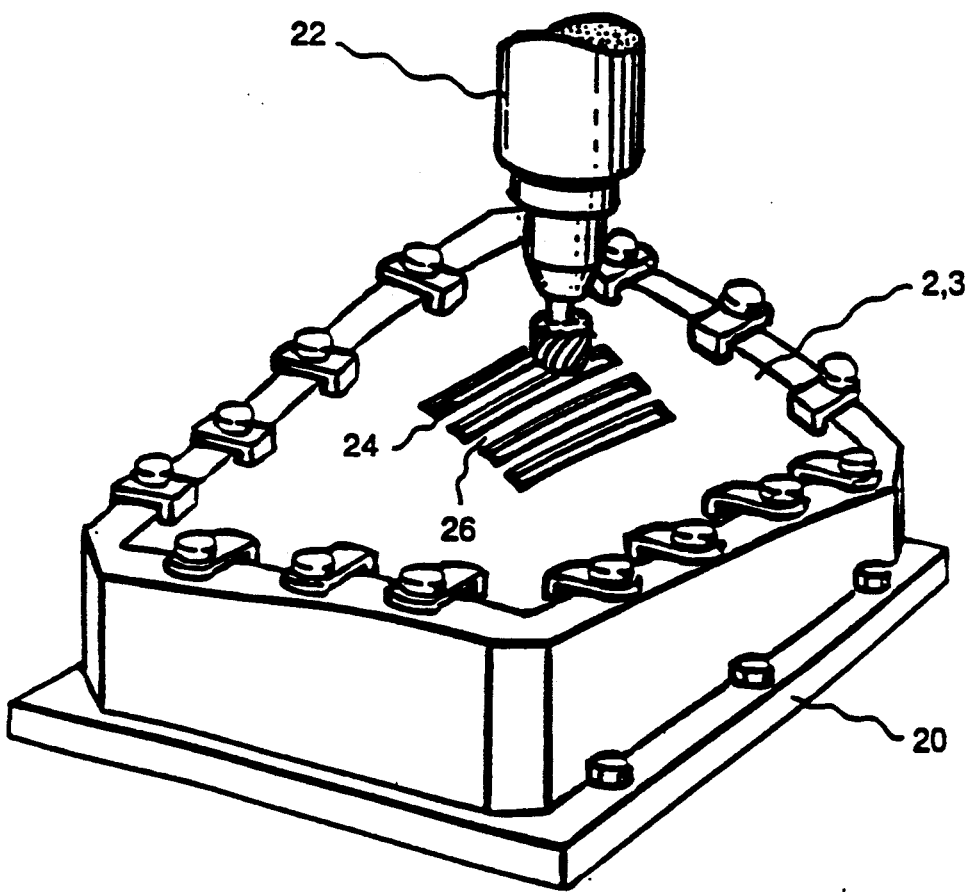

The next step is to machine shallow cavities into one surface of each of the face sheets. As seen in FIG. 1e, the face sheets 2,3 are successively placed in a nest fixture 20 which holds the sheets secure for machining. A mill 22 machines a series of elongated cavities 24 into the surface of the sheet. Narrow lands 26 are left between the cavities 24.

Figure 1F:
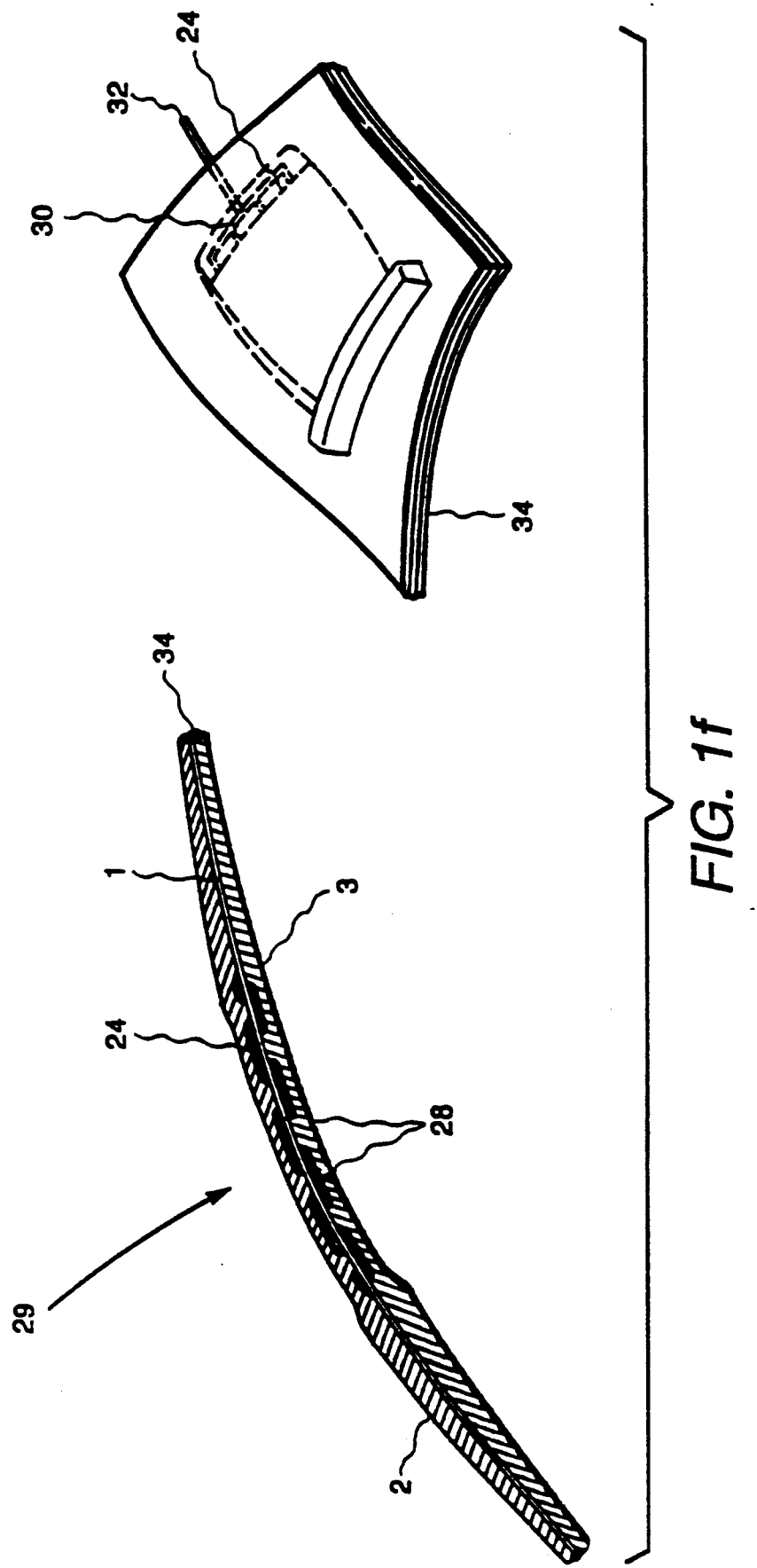

Next, a stopoff material 28 such as yttrium oxide is applied to the cavities 24 of both face sheets 2,3. No stopoff is applied to the lands 26 or any other part of the face sheets except for the cavities 24. The three sheets are arranged into the in-process assembly 29 as shown in FIG. 1f. The core sheet 1 is sandwiched between the two face sheets 2,3. The face sheets are situated so that the machined surfaces with the stopoff are facing the core sheet. The three sheets, having been previously shaped to their in-process shapes, fit snugly together in contacting relationship. As seen in FIG. 1f, the top face sheet 2 is convex and the bottom face sheet 3 is concave. An inflation gas manifold 30 having an externally-protruding inflation port 32 is disposed between the face sheets in order to provide a gas inlet to the cavities 24. After all of these elements have been so arranged, a seal weld 34 is applied around the periphery of the in-process assembly to seal the elements together.

Figure 1G:
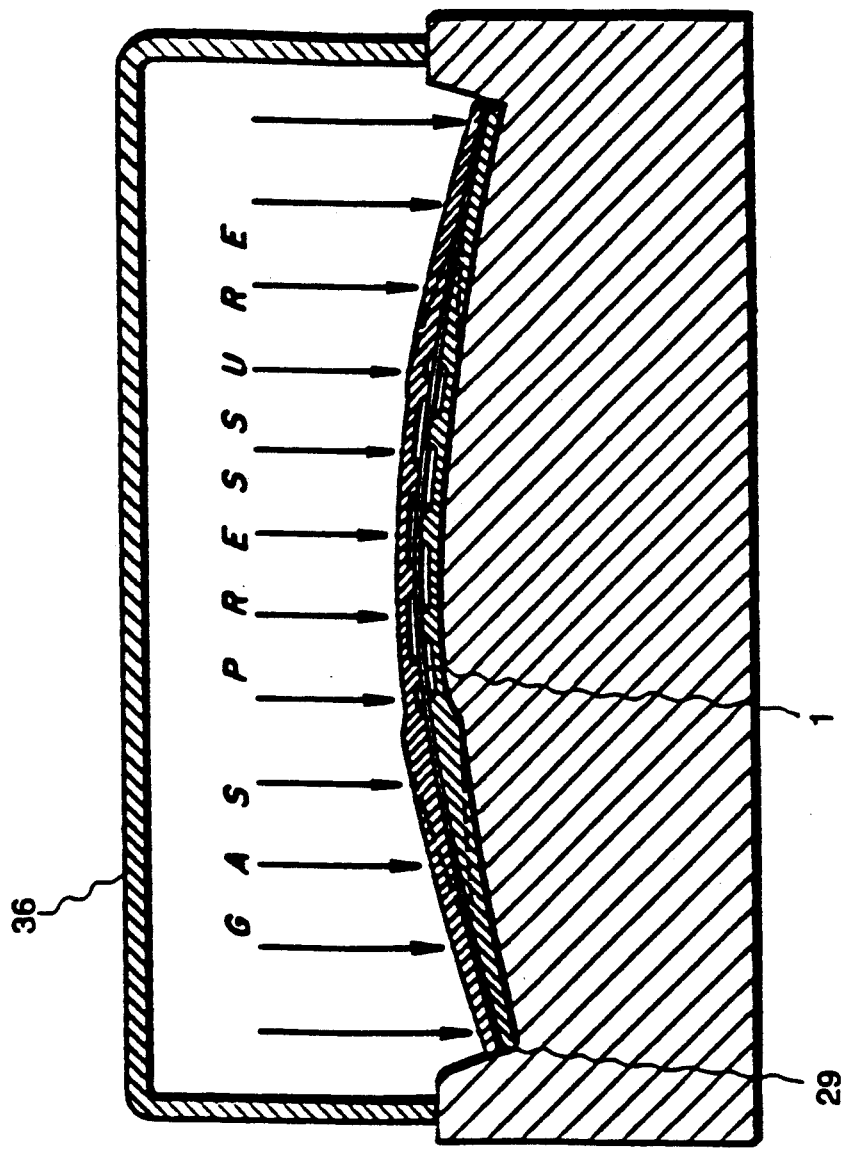

The diffusion bonding step is shown in FIG. 1g. The in-process assembly 29 is placed in an autoclave 36 or any other chamber capable of providing pressure and temperature conditions sufficient to cause diffusion bonding. The autoclave is sealed and heated to a temperature in the range of approximately 1600°–1800° F., preferably 1750° F. At this temperature, a pressure of approximately 300 pounds per square inch gauge (psig) or at least in the range of 60–500 psig is externally applied to the assembly 29 in the autoclave for up to three and a half hours. Under these temperature-pressure-time conditions, each of face sheets 2,3 diffusion bond to the core sheet 1. The titanium sheets diffusion bond at the lands 26 and all other locations where no stopoff is applied.

After diffusion bonding is completed, the in-process assembly 29 is transferred to a hard die 38 for superplastic forming as shown in FIG. 1h. The die 38 has a cavity 40 designed to match the desired final design shape of the hollow airfoil. Pressure is applied internally of the now sealed cavities 24 via the inflation port 32 and the inflation manifold 30. The in-process assembly 29 inflates to fill the die cavity 40 under the internal pressure, thereby superplastically deforming to the desired final design shape (see FIG. 1i). The inflation process is carried out at a temperature in the range of approximately 1500°–1700° F., preferably 1650° F. The pressure is applied at a ramp rate of preferably 5 psig per minute or at least in the range of 1–20 psig per minute. The ramp rate must be such as to maintain the superplasticity of the parts. Typically, a strain rate in the range of $10^{-3}$ to $10^{-5}$ inches per inches per second is needed for Titanium-6Aluminum-4Vanadium. The pressure is raised to a maximum pressure in the range of 60–500 psig, preferably about 300 psig. The pressure is maintained for up to two and a half hours including the initial pressure build up.

The temperature and pressure conditions described above can of course be varied as long as they are maintained within a suitable range, i.e., in which the values would be sufficient to induce diffusion bonding and superplastic forming. The time durations may also vary depending on the type of materials selected, thickness of the pieces, and the temperature and pressure conditions used.

The inflation process is preferably conducted in such a manner so as to inflate the hollow blade in only one direction instead of two. This is accomplished by designing the shape of in-process assembly 29 so that the concave face sheet 3 aligns with the lower, concave surface 42 of the die cavity 40. Thus, the concave face sheet 3 rests directly on the lower surface 42 and only the convex face sheet 2 is able to deform under pressure. This ensures that no grooving will occur along the concave surface of the airfoil. On the convex side, the convex face sheet 2 is inflated to fill the die and form a smooth surface. FIG. 1i shows the inflated airfoil 29a after full deformation. The convex face sheet 2 is deformed to the desired shape. The core sheet 1, being bonded to the lands 26 on the internal surfaces of the convex and concave face sheets 2,3, is deformed into a truss-like member which provides internal support to the hollow airfoil.

Figure 1J:
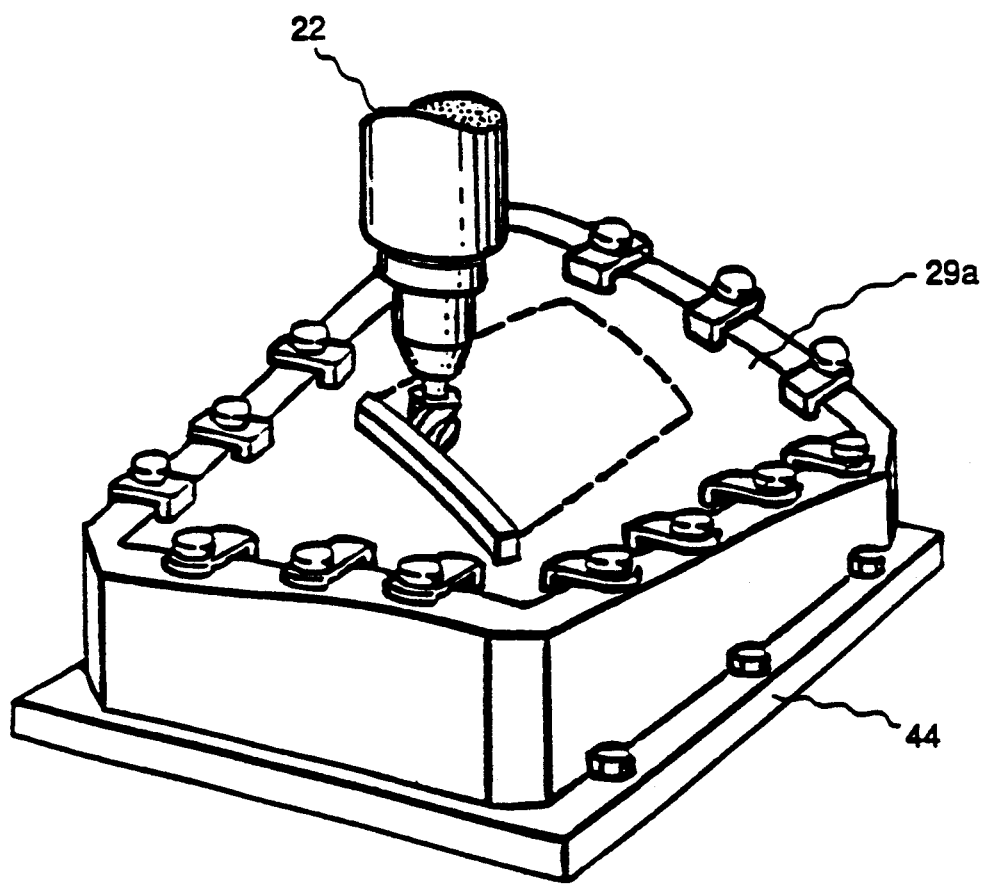

FIG. 1j shows the final step in which excess material is machined off of the inflated airfoil to achieve the final, desired shape. The inflated airfoil 29a is secured in a nest fixture 44 and the mill 22 is used to trim off the extra material. The dotted lines in FIG. 1j indicate the final shape of the finished airfoil.

Figure 2A:
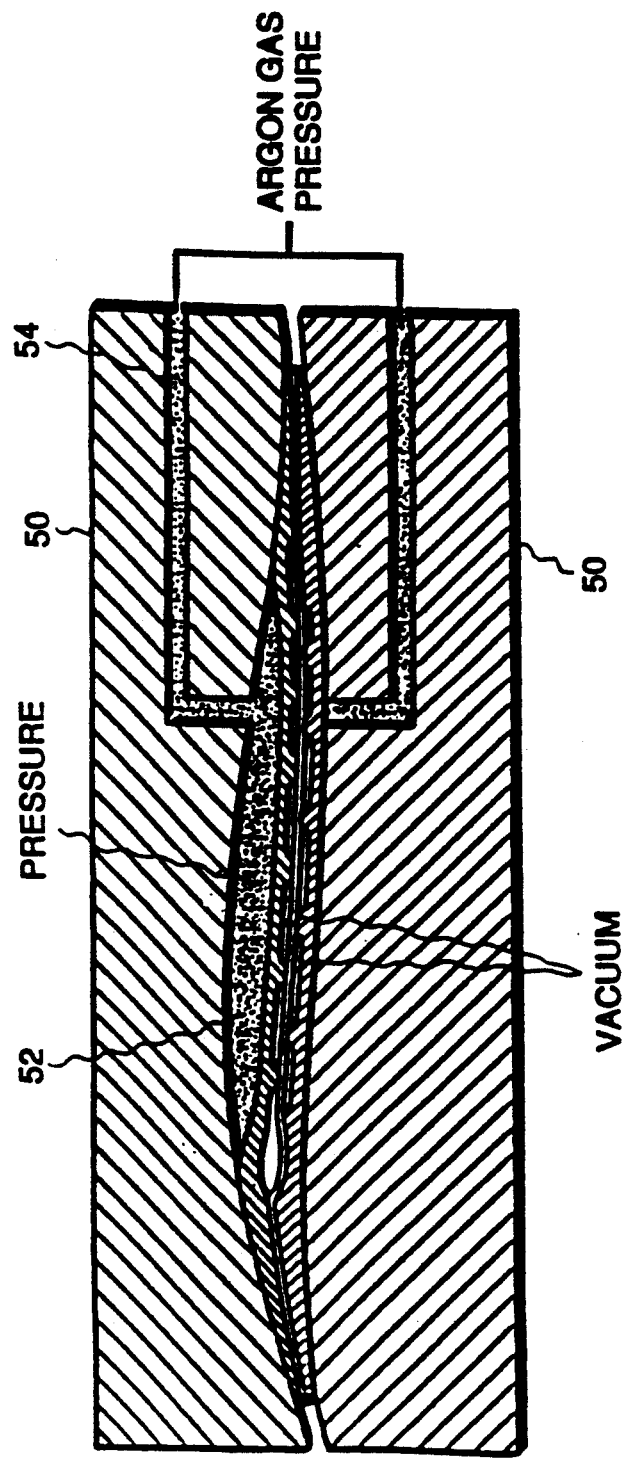
FIGS. 2a and 2b illustrate a variation of the method of FIGS. 1a–1j.
Figure 2B:
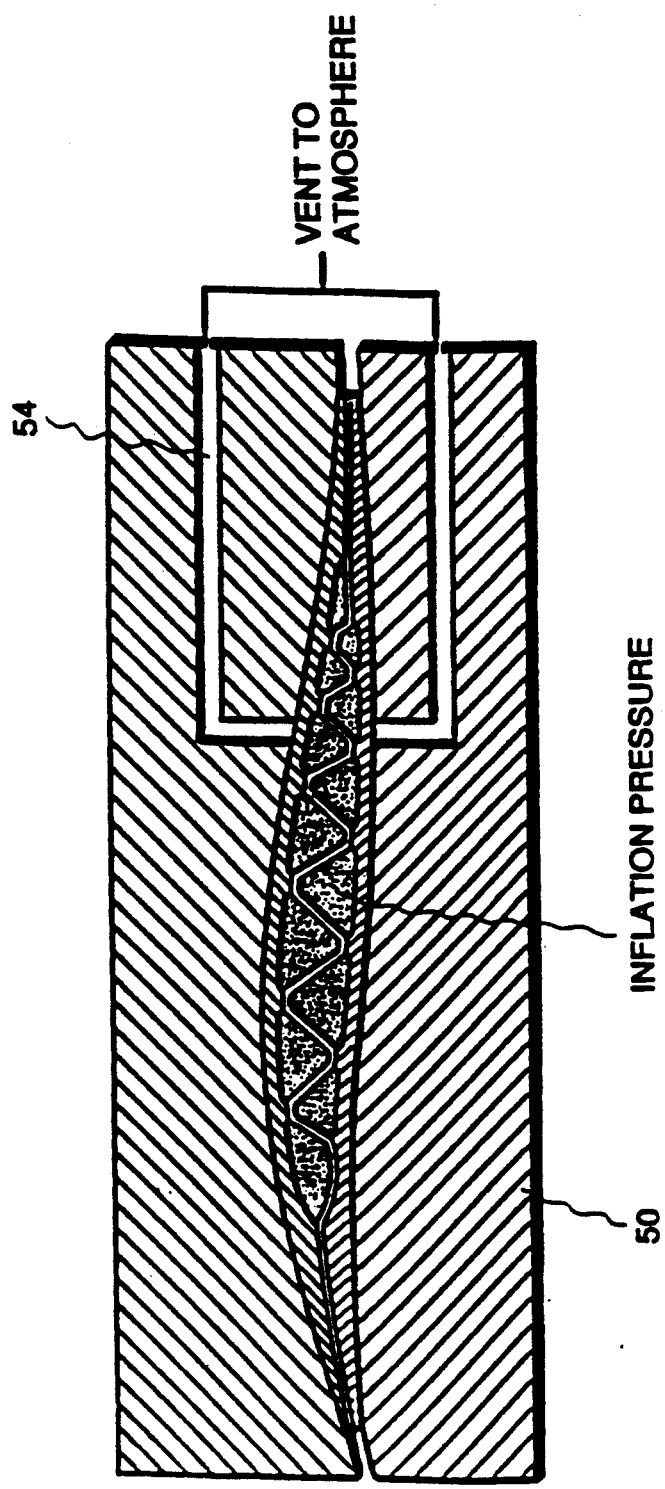

FIGS. 2a and 2b show a variation to the method of FIGS. 1a–1j. In this variation, the diffusion bonding and superplastic forming steps can be carried out in a single tool. A hard die 50 is provided having a cavity 52 designed to match the desired final design shape of the hollow airfoil. A plurality of passages 54 are provided in the hard 5 die 50 in order to permit the die cavity 52 to be submitted to pressure and to be vented. As seen in FIG. 2a, the in-process assembly 29 is situated in the hard die 50. A vacuum is applied to the inflation port 32. A source of gas pressure is applied to the passages 54 causing the in-process assembly 29 to be externally pressured. As in the first embodiment described above, a pressure in the range of 60–500 psig at a temperature in the range of approximately 1600°–1800° F. is externally applied to the assembly 29 for up to three and a half hours to complete diffusion bonding. In FIG. 2b, the source of gas pressure is removed from the passages 54 and the passages are vented to the atmosphere. A source of pressure is now applied to the inflation port 32 in order to internally pressurize the cavities 24 of the in-process assembly 29. As before, the inflation process is carried out at a temperature in the range of 1500°–1700° F. with a maximum pressure in the range of 60–500 psig for up to two and a half hours (including an initial pressure ramp rate of approximately 1–20 psig per minute).

To arrive at the designed dimensions of the final airfoil by superplastic forming, the initial shape and size of the in-process assembly must be determined. As discussed above, the concave face sheet 3 is not inflated so its in-process shape is simply determined by its desired final shape and thickness. The initial shape of the core sheet 1 is determined by the shape of the face sheets, because the core sheet is snugly sandwiched between the face sheets. The initial thickness of the core sheet 1 is a function of the degree of support the core sheet will provide to the finished hollow airfoil.

Figure 3A:
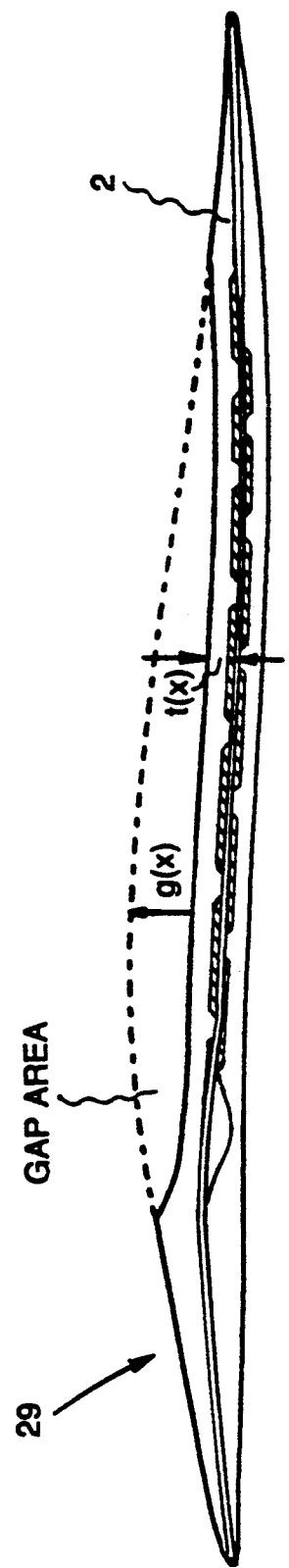
FIGS. 3a and 3b show a cross section of a hollow airfoil made by the method of the present invention before and after superplastic deformation, respectively.
Figure 3B:
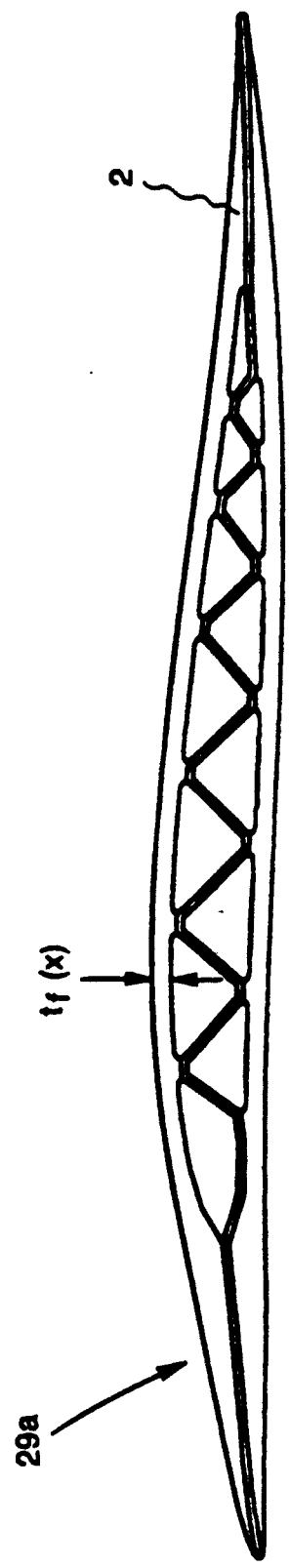

The in-process shape necessary for the convex face sheet 2 to be inflated to its desired shape and thickness is determined mathematically. FIGS. 3a and 3b show the in-process assembly 29 and the inflated airfoil 29a, respectively. Both configurations are shown in cross section along the chord direction X. In the sense used here, "chord" refers to the straight line joining the leading and trailing edges of an airfoil. Thus, the "chord direction X" is the direction along a straight line joining the leading and trailing edges of the airfoil assembly. When the convex sheet 2 is superplastically deformed from the in-process shape to the desired design shape, it expands upward from the position shown in FIG. 3a to the position shown in FIG. 3b, thereby defining a gap which is shown in dotted line in FIG. 3a. Each point on the top surface of the sheet will move a particular distance, called the gap distance, across the gap. This gap distance distribution along the chord direction X is denoted by the reference character g(x). The distance along the upper surface of the convex sheet 2 from the leading edge to the trailing edge, hereinafter referred to as "arc length," also changes during deformation. Specifically, the arc length increases as the convex sheet expands during inflation.

The superplastic forming of the airfoil will produce an overall increase in surface area of the convex sheet 2. In addition, this deformation of the sheet results in a change in its thickness distribution. As seen in FIG. 3a, the thickness distribution along the chord direction X of the convex sheet 2 prior to deformation is denoted by the reference character t(x). The thickness distribution of the convex sheet 2 after deformation is denoted by the reference character $t_f(x)$. For the purpose of this calculation, the thickness of the convex sheet 2 is assumed to be a constant thickness. Thus, the small lands 26 which result when the shallow cavities 24 are machined into the surface of the convex sheet are not considered to be part of the thickness.

The thickness distribution after deformation, $t_f(x)$, is a design consideration which can be determined depending on the operating conditions the airfoil will be exposed to. The in-process thickness distribution, t(x), is dependent on the final thickness distribution, $t_f(x)$, and can be determined by the following equation:

$$t(x) = t_f(x)\left(1 + \frac{l_f - l}{\int_0^1 g(s)ds} g(x)\right)$$

where $t_f(x)$ is the known thickness distribution along the chord direction X of the convex sheet 2 after deformation (i.e., the desired thickness), g(x) is the gap distance a particular point along the chord direction X on the outer surface of the convex sheet will move during deformation, $l_f$ is the arc length of the convex sheet after deformation, l is the arc length of the convex sheet before deformation, and the denominator is the area of the gap defined between the top surface of the convex sheet before and after deformation (shown by dotted line in FIG. 3a). The gap distance, g(x), is not a pure independent variable but is related to the initial thickness distribution, t(x). Thus, the above equation must be solved by iterative methods.

The foregoing has described a method of manufacturing a three-piece hollow airfoil using diffusion bonding and superplastic forming techniques which overcomes the problems of deformation-induced instabilities and defining the in-process shape.

While specific embodiments of the present invention have been described, it will be apparent to those skilled in the art that various modifications thereto can be made without departing from the spirit and scope of the invention as defined in the appended claims.

We claim:

1. A method of making hollow airfoils from three pieces comprising the steps of:
    providing each of the three pieces with an initial camber and twist;
    joining the three pieces together into an assembly with one piece disposed between the other two pieces subsequently to said step of providing each of the three pieces with an initial camber and twist; and
    applying pressure between said one piece and each of said other two pieces so that said assembly superplastically deforms into a hollow airfoil.

2. The method of claim 1 wherein the step of joining the three pieces together comprises forming a plurality of cavities in said other two pieces, applying stopoff to each of said cavities, sealing the pieces together around their peripheries, and applying a sufficient external pressure to said assembly so that the portions of the pieces lacking stopoff diffusion bond together.

3. The method of claim 2 wherein the step of applying a sufficient external pressure to said assembly comprises applying pressure in the range of 60-500 psig at a temperature in the range of 1600°-1800° F. for up to three and a half hours.

4. The method of claim 2 wherein the step of applying pressure between said one piece and each of said other two pieces comprises applying pressure to the cavities at a ramp rate of approximately 1-20 psig per minute to a maximum pressure in the range of 60-500 psig at a temperature in the range of 1500°-1700° F. for a total of up to two and a half hours.

5. The method of claim 1 wherein the step of applying pressure between said one piece and each of said other two pieces is carried out so that only a first one of said other two pieces superplastically deforms.

6. The method of claim 5 wherein the in-process thickness distribution, t(x), along the chord direction X of said first piece is determined by the equation:

$$t(x) = t_f(x)\left(1 + \frac{l_f - l}{\int_0^1 g(s)ds} g(x)\right)$$

where $t_f(x)$ is the known thickness distribution along the chord direction X of said first piece after deformation, g(x) is the gap distance a particular point along the chord direction on the outer surface of said first piece will move during deformation, $l_f$ is the arc length of said first piece after deformation, l is the arc length of said first piece before deformation, and the denominator is the area of the gap defined by the top surface of said first piece before and after deformation.

7. A method of making hollow airfoils having a desired shape comprising the steps of:
forming two face sheets into respective predetermined curved in-process shapes;
forming a core sheet into a predetermined curved in-process shape;
machining a plurality of cavities in each of said two face sheets;
applying stopoff to each of said cavities;
arranging all of said sheets to form an in-process assembly with said core sheet being disposed between said two face sheets;
applying pressure to the outer surfaces of said in-process assembly so that the portions of said face sheets that lack stopoff diffusion bond to said core sheet; and
applying pressure in said cavities so that said in-process assembly superplastically deforms to the desired shape.

8. The method of claim 7 further comprising the step of machining off excess material after said in-process assembly is superplastically deformed.

9. The method of claim 7 wherein the step of arranging said sheets to form an in-process assembly further comprises sealing said sheets together by welding around their peripheries.

10. The method of claim 7 wherein the step of applying pressure to the outer surfaces of said in-process assembly comprises placing said in-process assembly into an autoclave and applying a pressure in the range of approximately 60-500 psig for up to three and a half hours.

11. The method of claim 10 wherein the step of applying pressure to the outer surfaces of said in-process assembly is carried out at a temperature in the range of 1600°-1800° F.

12. The method of claim 7 wherein the step of applying pressure in said cavities comprises placing said in-process assembly in a die and applying pressure to the cavities at a ramp rate of approximately 1-20 psig per minute to a maximum in the range of 60-500 psig for a total of up to two and a half hours.

13. The method of claim 12 wherein the step of applying pressure in said cavities is carried out at a temperature in the range of 1500°-1700° F.

14. The method of claim 7 wherein the step of applying pressure to the outer surfaces of said in-process assembly comprises placing said in-process assembly into a die having a die cavity and passage means for permitting fluid communication between said die cavity and the atmosphere and applying a pressure in the range of 60-500 psig in said die cavity for up to three and a half hours via said passage means.

15. The method of claim 14 wherein the step of applying pressure to the outer surfaces of said in-process assembly is carried out at a temperature in the range of 1600°-1800° F.

16. The method of claim 14 wherein the step of applying pressure in said cavities comprises leaving said in-process assembly in said die, venting said die cavity to the atmosphere via said passage means, and applying pressure to the cavities at a ramp rate of approximately 1-20 psig per minute to a maximum in the range of 60-500 psig for a total of up to two and a half hours.

17. The method of claim 16 wherein the step of applying pressure in said cavities is carried out at a temperature in the range of 1500°-1700° F.

18. The method of claim 7 wherein the step of forming said two face sheets into predetermined in-process shapes comprises first hot forming said sheets in a hot form press and then superplastic forming said sheets with a superplastic forming tool, and the step of forming said core sheet into a predetermined in-process shape comprises hot forming said core sheet in a hot form press.

19. The method of claim 18 further comprising using titanium sheets for said two face sheets and said core sheet.

20. The method of claim 7 wherein the step of forming said two face sheets into predetermined in-process shapes comprises near-net-shape forging said face sheets in a forge press.

21. The method of claim 7 wherein the step of applying pressure in said cavities is carried out so that only a first one of said two face sheets superplastically deforms.

22. The method of claim 21 wherein the in-process thickness distribution, t(x), along the chord direction X of said first face sheet is determined by the equation:

$$t(x) = t_f(x)\left(1 + \frac{l_f - l}{\int_0^1 g(s)ds} g(x)\right)$$

where $t_f(x)$ is the known thickness distribution along the chord direction X of said first face sheet after deformation, $g(x)$ is the gap distance a particular point along the chord direction X on the outer surface of said first face sheet will move during deformation, $l_f$ is the arc length of said first face sheet after deformation, $l$ is the arc length of said first face sheet before deformation, and the denominator is the area of the gap defined by the top surface of said first face sheet before and after deformation.

* * * * *